United States Patent [19]

Hirota

[11] 4,329,944
[45] May 18, 1982

[54] EXCESS AIR FACTOR CONTROL DEVICE FOR AN ALCOHOL REFORMED GAS ENGINE

[75] Inventor: Toshio Hirota, Tokyo, Japan

[73] Assignee: Nissan Motor Co., Ltd., Yokohama, Japan

[21] Appl. No.: 118,080

[22] Filed: Feb. 4, 1980

[30] Foreign Application Priority Data

Feb. 5, 1979 [JP] Japan ................................. 54-11372
Feb. 28, 1979 [JP] Japan ................................. 54-21875

[51] Int. Cl.³ ............................................ F02B 43/08
[52] U.S. Cl. ........................................ 123/3; 123/1 A
[58] Field of Search ............... 123/1 A, 3, 198 A, 585

[56] References Cited

U.S. PATENT DOCUMENTS 3,915,125  10/1975  Henkel et al. ............................ 123/3
3,963,000   6/1976  Kosaka et al. ........................... 123/3
4,244,328   1/1981  Lindstrom ............................. 123/1 A

FOREIGN PATENT DOCUMENTS 2010769  9/1971  Fed. Rep. of Germany .
2148506  4/1973  Fed. Rep. of Germany .
2235004  1/1974  Fed. Rep. of Germany .
227229   8/1943  Switzerland .

OTHER PUBLICATIONS

"Electronik im Automobil . . . ", by Dr. Karsten Ehlers, Funkschau 1978, No. 14.

Primary Examiner—Craig R. Feinberg
Assistant Examiner—E. Rollins Cross
Attorney, Agent, or Firm—Lowe, King, Price & Becker

[57] ABSTRACT

An excess air factor control device for an alcohol reformed gas engine comprises a primary air valve, a reformed gas supply device interlocked with the primary air valve, a primary air flow meter for measuring primary air flow rate, a gas flow meter for measuring reformed gas flow rate, a secondary air valve for a secondary air controlled by the reformed gas flow rate and an alcohol adding device controlled by the primary air flow rate and reformed gas flow rate, thereby supplying alcohol to the engine when the supply of the reformed gas becomes little or is stopped.

6 Claims, 12 Drawing Figures

EXCESS AIR FACTOR CONTROL DEVICE FOR AN ALCOHOL REFORMED GAS ENGINE

BACKGROUND OF THE INVENTION

1. Field of the Invention

The present invention relates to an excess air factor control device for an alcohol reformed gas engine for use in transportation vehicles, power generation and rotary machines.

2. Description of the Prior Art

Such an alcohol reformed gas engine using a gas fuel mainly containing hydrogen and carbon monoxide obtained by reforming alcohol is superior particularly for use in an automobile because of its high thermal efficiency and relatively clean exhaust gas. The engine, however, has the following three disadvantages.

(1) At an excess air factor (less than 1.3) near a stoichiometrical air fuel ratio, there is a tendency of the engine to cause extraordinary burning such as backfiring and therefore combustion control is difficult, so that the maximum torque is suppressed to a lower value.

(2) In order to operate the engine with reformed gas over all the operation modes, a reforming device becomes unavoidably large and highly expensive.

(3) In warm-up or idling operation for long periods of time (e.g. more than twenty minutes), the temperature of the reforming device becomes low to an extent such that the reformed gas is not produced and therefore to stop the supply of the gas required for engine operation.

To solve these problems, it has been suggested to temporarily supply alcohol as it is to an engine. In other words, the engine is operated only with the reformed gas during normal operating condition such as acceleration and deceleration in streets or cruise travelling at speeds lower than 100 km/hour and alcohol is supplied to the engine when the supply of the reformed gas is stopped under a condition of the maximum torque seldom used, a high speed more than 100 km/hour, warm-up, idling for a long period of time or the like. Such a suggestion was, however, only an idea without any concrete controlling method and device, because of a difficulty to realize it.

SUMMARY OF THE INVENTION

It is therefore an object of the invention to provide an excess air factor control device for an alcohol reformed gas engine which eliminates the disadvantages of the alcohol reformed gas engine above described.

It is another object of the invention to provide an excess air factor control device for an alcohol reformed gas engine comprising means for embodying the technical idea as above described.

For these objects, the excess air factor control device for an alcohol reformed gas engine according to the invention comprises a primary air valve provided in a primary air supply passage and operated by operating means, reformed gas supply means operated in interlocked relation to said primary air valve, a primary air flow meter for measuring primary air flow rate, a gas flow meter for measuring reformed gas flow rate, a secondary air valve provided in a secondary air supply passage and controlled by said reformed gas flow rate and alcohol adding means controlled by said primary air flow rate and said reformed gas flow rate.

The invention will be more fully understood by referring to the following detailed specification and claims taken in connection with the appended drawings.

DETAILED DESCRIPTION OF THE PREFERRED EMBODIMENT

Figure 1:
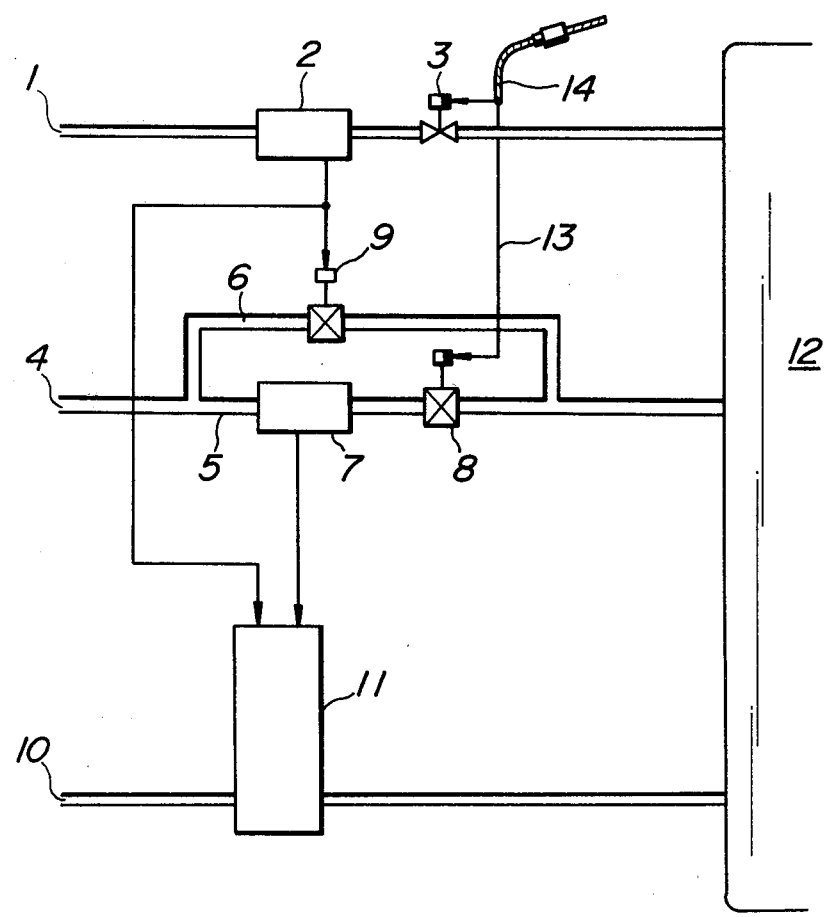
FIG. 1 illustrates an arrangement of the device according to the invention.

Referring to FIG. 1 diagrammatically illustrating an arrangement of the device according to the invention, a reformed gas containing hydrogen and carbon monoxide as principal components is introduced at a gas inlet 1 and supplied to an engine 12 through a gas flow meter 2 and a gas valve 3 in which a flow rate of the gas is regulated. Air is introduced at an air inlet 4 and divided into a primary air in a primary air supply passage 5 which passes through a primary air flow meter 7 and a primary air valve 8 wherein a flow rate of the primary air is controlled, and a secondary air in a secondary air supply passage 6 which passes through a secondary air valve 9 wherein a flow rate of the secondary air is controlled and thereafter mixed with the primary air to be supplied to the engine 12. Pressures in the reformed gas and air at the respective inlets 1 and 4 are atmospheric, so that they flow through the respective supply passages with the aid of an intake negative pressure in the engine 12. Alcohol is introduced at an alcohol inlet 10, whose flow rate is controlled in an alcohol device 11 to be supplied to the engine.

The gas valve 3 and primary air valve 8 are interlocked by an interlocking device 13 and actuated by an accelerator wire 14 such that a ratio of the primary air flow rate to the refined gas flow under normal operating conditions of the engine becomes substantially equal to a stoichiometrical air fuel ratio (excess air factor 1.0). The secondary air valve 9 is controlled by the gas flow rate measured by the gas flow meter 2, such that a ratio of the secondary air flow rate to the gas flow rate is smaller in a zone of a little gas flow rate.

Figure 2:
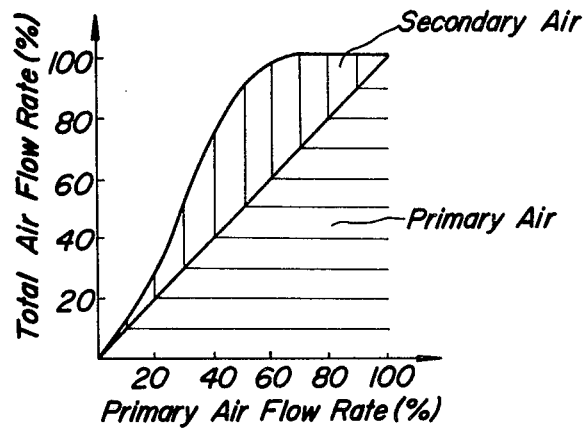
FIG. 2 is a graph illustrating an air flow rate characteristic.

FIG. 2 illustrates a relation between the primary air flow rate corresponding to the operation of the accelerator wire 14 and the total air flow rate. As can be seen from this graph, the total air flow rate is saturated in a zone of a large amount of the primary air flow rate.

Figure 3:
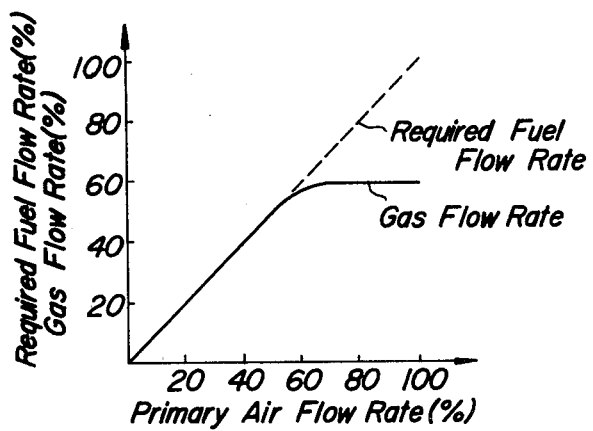
FIG. 3 is a graph showing a relation between a primary air flow rate and gas flow rate.

In this case, if the gas flow rate proportional to the primary air flow rate is supplied, the output of the engine can be controlled responsive to the operated amount of the accelerator wire 14. This gas flow rate is indicated as required fuel flow rate in a broken line in FIG. 3. The gas flow rate inherently increases along the line of this required flow rate. The gas flow rate, however, is also saturated as shown in a solid line in FIG. 3 because of a less intake negative pressure of the engine in the zone where the air flow rate is saturated.

A difference between the required fuel flow rate and gas flow rate corresponds to a flow rate of alcohol to be added to the engine. The alcohol adding device 11 controls the alcohol flow rate depending upon gas flow rate and primary air flow rate measured in the gas flow meter 2 and primary air flow meter 7, respectively.

In a high speed zone of an engine, moreover, an amount of a reformed gas from the reforming device becomes insufficient and hence to saturate a gas flow rate even in a zone of a load where an air flow rate is not saturated. In this case, the engine can also be smoothly controlled by determining an amount of alcohol to be added depending upon the required fuel flow rate and gas flow rate.

Figure 4:
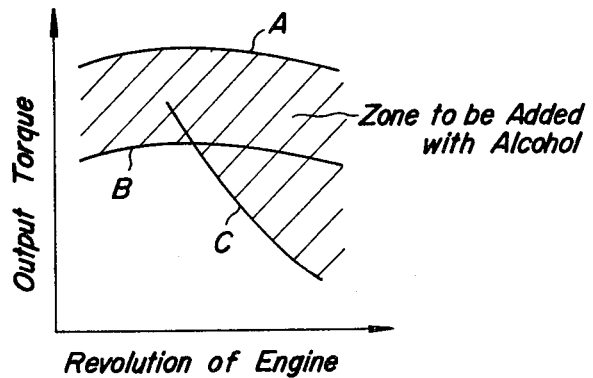
FIG. 4 is a graph illustrating a relation between operating conditions of an engine and zones to be added with alcohol.
Figure 5:
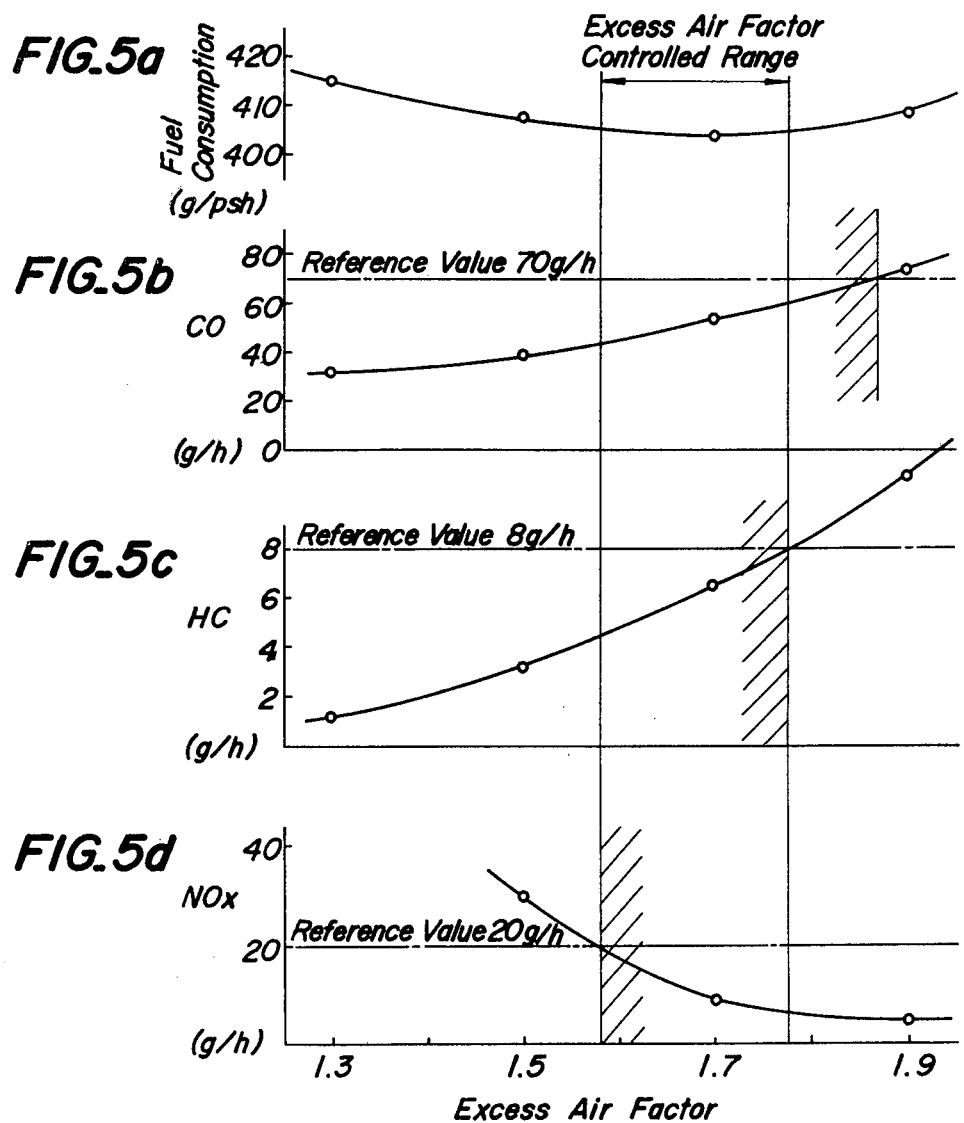
FIGS. 5a–5d are graphs illustrating relations between excess air factor and fuel consumption and exhausted injurious components.

FIG. 4 illustrates a zone where alcohol is to be added determined by relations between revolutions of an engine and torques of an output shaft of the engine. A line A shows torques when a throttle valve is fully opened, a line B indicates torques affected by the saturation of gas flow rate owing to less intake negative pressure due to the saturation of air flow rate and a line C indicates torques corresponding to the saturation of gas flow rate for lack of reformed gas supply amount from the reforming device. In the case of FIG. 4, the shaded area is the zone where alcohol is to be added.

In case of a lack of reformed gas due to low temperature of exhaust gas as in warm-up or the like, alcohol is added to the engine with the aid of a difference between the required fuel flow rate and gas flow rate caused by the fact that the gas does not flow much although the gas valve 3 is opened. Particularly, when the gas flow rate is zero, the secondary air valve 9 does not open, so that an amount of alcohol proportional to an air flow rate is supplied, with the result that the engine is operated as an alcohol engine.

The optimum excess air factor responsive to operating conditions of an engine will be explained in more detail hereinafter. FIGS. 5a–5d illustrate effects of excess air factors on fuel consumptions and exhausted injurious components under an operating condition of 1,600 rpm and 6 kg.m of output torque of a four-cylinder engine having a displacement of 2,000 cc. As the exhausted amounts of CO, HC and NOx more than reference values shown in FIGS. 5b–5d injuriously affect the human bodies, the excess air factor must be set within 1.6–1.8 in order to suppress the injurious components less than the reference values. It is understood from FIG. 5a that the excess air factor 1.7 is the best in view of the fuel consumption.

Figure 6:
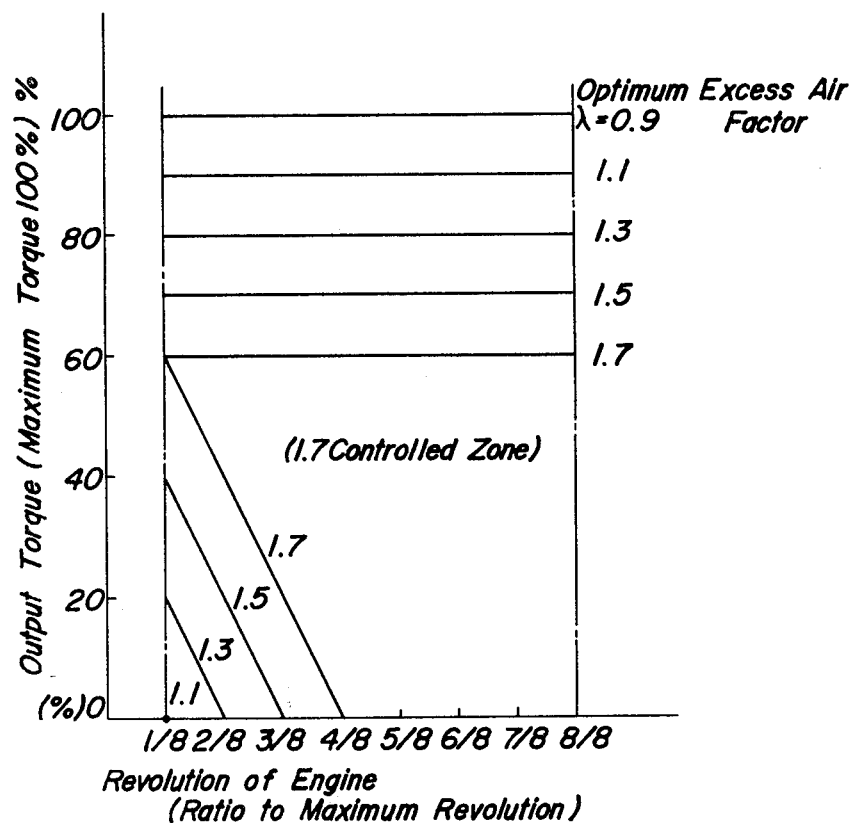
FIG. 6 is a graph showing the optimum excess air factors responsive to operating conditions of an engine.

The optimum excess air factor varies depending upon operating conditions of the engine. FIG. 6 illustrates the optimum excess air factors determined in the same manner as above described. It is clear that the excess air factor of approximately 1.7 is the most suitable for normal operating conditions and it is preferable to make smaller the excess air factor as the torques increase. It is, moreover, preferable for the zone of small output torques to make the excess air factor small in order to keep the temperature of exhaust gas to ensure the stability of the engine (because the reformed gas engine utilizes the heat of the exhaust gases for the reforming reaction of alcohol).

Figure 7:
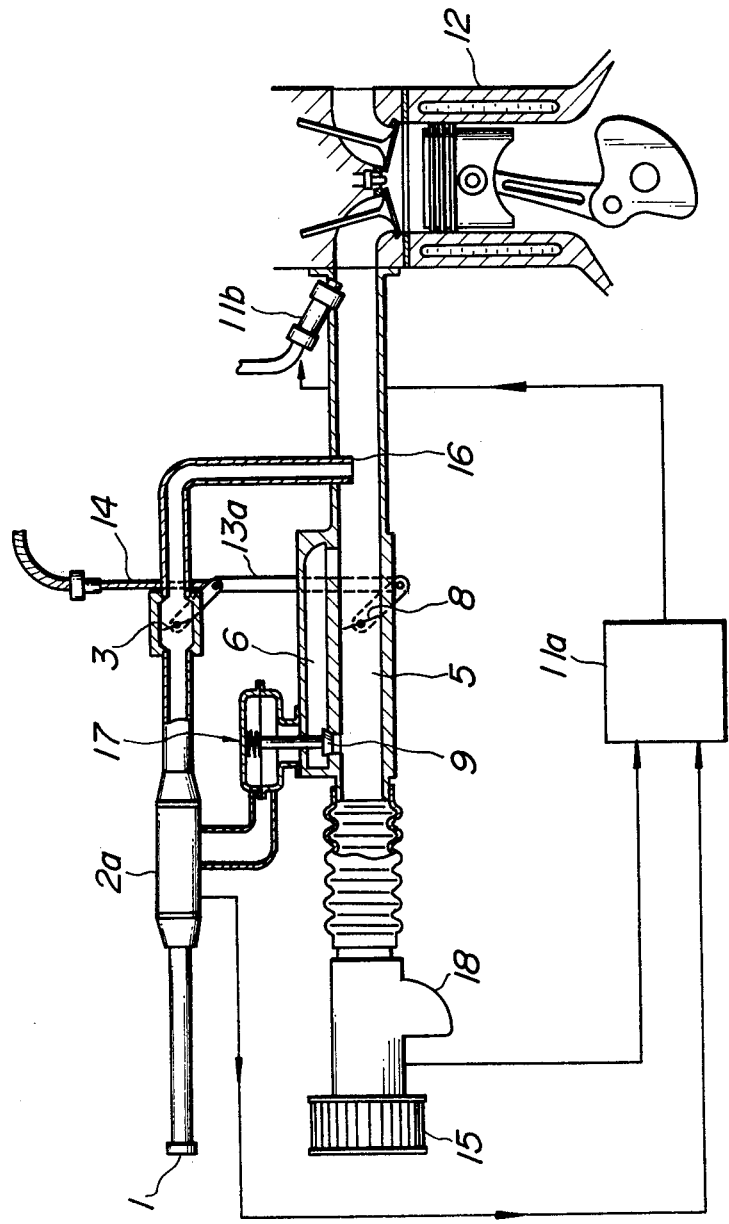
FIG. 7 is an elevation of one embodiment of the device according to the invention.

FIG. 7 illustrates one embodiment in detail for putting the invention to practical use. A laminar flow-type gas flow meter 2a is used as a gas flow meter 2. Interlocking links 13a are used as an interlocking device between a gas valve 3 and primary air valve 8. An electronically controlled fuel injection system comprising an injection amount controller 11a and an alcohol injector 11b is used as an alcohol adding device 11. This device further includes an air cleaner 15, a gas nozzle 16 and a secondary air valve actuator for controlling a secondary air valve 9 with the aid of differential pressures in the laminar flow-type gas flow meter 2a. An air flow meter 18 is used for the total amount of air. In the injection amount controller 11a a secondary air flow rate is calculated by the use of a gas flow rate to obtain a primary air flow rate as a difference therefrom and finally to obtain an alcohol injection amount from the gas flow rate and primary air flow rate as above described.

Figure 8:
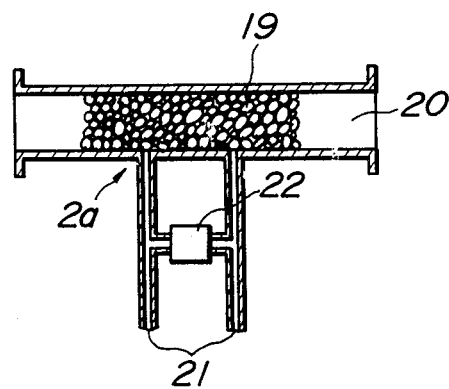
FIG. 8 is a sectional view of an example of a laminar flow-type gas flow meter used in the device according to the invention.

FIG. 8 illustrates a concrete example of the laminar flow-type gas flow meter 2a comprising differential pressure pipes 21 for extracting differential pressures in front and rear portions of a gas passage 20 filled with metallic grains, which are connected to the secondary air valve actuator 17, and a pressure converter 22 for converting the differential pressures into electrical signals, whose outputs are fed to the injection amount controller 11a.

Gas flow meters other than the meter 2 may be used, such as a laminar flow-type flow meter of a honeycomb structure, a mass flow meter incorporating therein compensating means for variations in temperature, pressure and composition of gas or flow meter utilizing an orifice or venturi tube.

Figure 9:
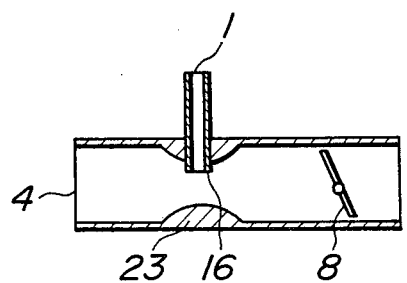
FIG. 9 is a sectional view of a modification of a reformed gas supply device used in the device according to the invention.

FIG. 9 shows an embodiment utilizing negative pressure at a venturi tube 23 without using a gas valve for an interlocking device for the reformed gas supply device and a primary air valve 8. If a gas pressure at the gas inlet 1 and an air pressure at the air inlet 4 are equal, the gas is sucked through a gas nozzle 16 with the aid of the negative pressure at the venturi tube 23 to keep constant the ratio of the primary air flow rate to the gas flow rate.

The alcohol adding device 11 is not necessarily the electronically controlled fuel injection system but may be the conventional carburetor.

As can be seen from the above explanation, according to the invention the primary air valve and an alcohol reformed gas supply device are interlocked thereby keeping a constant air-fuel ratio when the alcohol reformed gas is sufficient, and further the gas flow rate is measured by means of the gas flow meter to control the secondary air valve thereby obtaining air flow rate responsive to the gas flow rate.

According to the invention, moreover, in response to operating conditions of the engine and reformed gas supply the optimum amount of alcohol can be applied to the engine by operating the alcohol adding device by measuring the gas and air flow rates by means of gas and air flow meters when the supply of the reformed gas is insufficient. In zones of high torque and high output, therefore, alcohol is added into the engine to improve the maximum torque and output characteristics of the engine, thereby eliminating the disadvantages of reformed gas engines. In warm-up, furthermore, the engine is operated with alcohol by an automatic transition, and when the pressure of the reformed gas becomes high sufficient to supply the reformed gas into the engine the supply of alcohol is stopped. These procedures are so smooth as not to affect the operation of the engine.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An excess air factor control device for an alcohol reformed gas engine, comprising a primary air valve located within a primary air supply passage, operating means for controlling operation of the primary valve, reformed gas supply means for supplying reformed gas to the engine, a secondary air valve located within a secondary air supply passage, alcohol adding means for supplying alcohol to said engine, and a gas flow meter for measuring reformed gas flow rate, said reformed gas supply means being operated in interlocked relation to said primary air valve, said secondary air supply passage being controlled by the reformed gas flow rate measured by said gas flow meter, said alcohol adding means being controlled independent of temperature by said reformed gas flow rate and primary air flow rate measured by the gas flow meter and an air flow meter.

2. An excess air factor control device as set forth in claim 1, further including interlocking means for interlocking said primary air valve and said reformed gas supply means to produce an excess air factor ratio of approximately 1.0, said ratio being a ratio of the primary air flow rate controlled by said primary air valve to the reformed gas flow rate controlled by said reformed gas supply means.

3. An excess air factor control device as set forth in claim 1, wherein said alcohol adding means is controlled to add an amount of alcohol to the engine corresponding to a difference between a required fuel flow rate determined by said primary air flow rate and said reformed gas flow rate.

4. An excess air factor control device as set forth in claim 2 or 1, wherein said gas flow meter comprises a laminar flow-type gas flow meter, said interlocking means includes interlocking links for interlocking said reformed gas supply means and said primary air valve, and said alcohol adding means includes an electronically controlled fuel injection system having an injection amount controller and an alcohol injector.

5. An excess air factor control device as set forth in claim 4, wherein said device further includes a secondary air valve actuator and said laminar flow-type gas flow meter includes a pair of differential pressure pipes each communicating with front and rear portions of a gas passage for extracting differential pressures therefrom, said differential pressure pipes being connected to the secondary air valve actuator for controlling the secondary air valve with said differential pressures, said device further comprising a pressure converter for converting said differential pressures into electrical signal outputs fed to said injection amount controller.

6. An excess air factor control device as set forth in claim 1, further including a venturi tube for interlocking said reformed gas supply means and said primary air valve.

* * * * *